S. Raymond,
Hay Fork.
No. 40709 Patented Nov. 24, 1863.
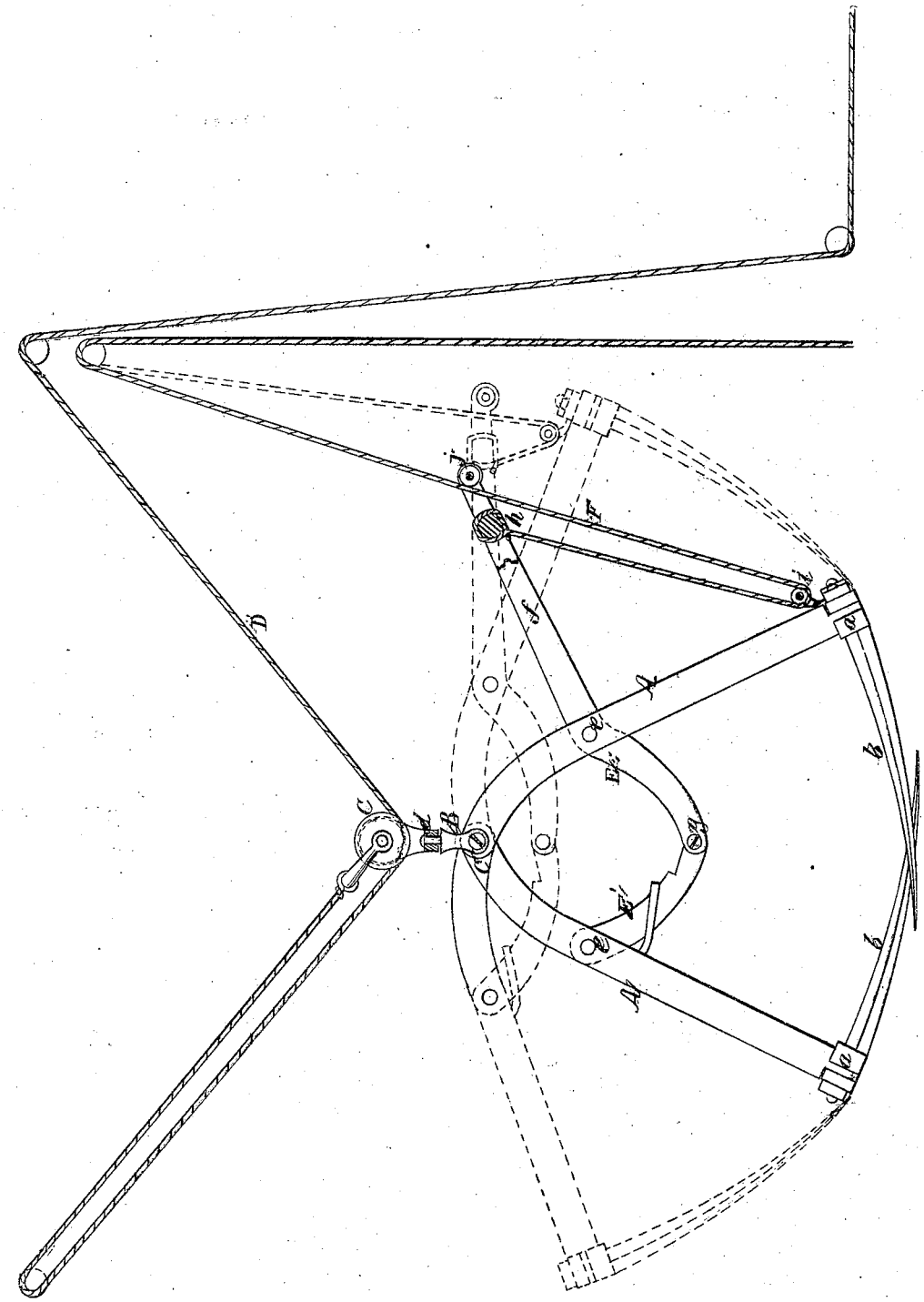
WITNESSES
J W Coombs
Geo W Reed
INVENTOR
Squire Raymond
per Munn & Co
Attorneys

UNITED STATES PATENT OFFICE.

SQUIRE RAYMOND, OF GENOA, NEW YORK.

IMPROVEMENT IN HORSE-PITCHFORKS.

Specification forming part of Letters Patent No. 40,709, dated November 24, 1863.

*To all whom it may concern:*

Be it known that I, SQUIRE RAYMOND, of Genoa, in the county of Cayuga and State of New York, have invented a new and Improved Horse-Pitchfork; and I do hereby declare that the following is a full, clear, and exact description of the same, reference being had to the accompanying drawing, making a part of this specification, said drawing being a side view of my invention.

This invention relates to an improvement on a horse-pitchfork for which Letters Patent were granted to me, bearing date November 11, 1862.

The within-described improvement consists in the employment or use of a swivel-pulley attached to the device in such a manner that the fork will be allowed to rotate freely without twisting the hoisting-rope, and the construction of the implement at the same time simplified and rendered more perfect in its operation.

The improvement further consists in a novel application of the rope to the discharging mechanism, whereby the latter may be operated with greater facility than hitherto.

To enable those skilled in the art to fully understand and construct my invention, I will proceed to describe it.

A A represent the two fork arms or frames, composed each of three metal bars arranged in V-form, and connected at their lower ends by cross-bars $a$, in which teeth $b$ are secured. These parts may be constructed substantially the same as those in my patented pitchfork previously referred to, and therefore do not require a particular or minute description. The upper ends of the fork arms or frames A A are connected together by a pivot, $c$, which pivot also attaches a stirrup, B, to the arms or frames, and to this stirrup B a swivel-pulley, C, is attached by a pin or bolt, $d$. This arrangement is essentially different from that of my patented pitchfork, the latter having its pulley fitted in a frame to which the fork arms or frames are connected by separate pulleys. This plan does not admit of the fork turning without twisting the hoisting-rope, and it possesses the disadvantage of not admitting the load to be freely discharged. My improvement, it will be seen, obviates these difficulties.

The fork, by means of the swivel-pulley, may turn freely in either direction, and the fork arms or frames are, in consequence of being connected by a single bolt or pivot, allowed to work freely, and the implement manipulated with much greater facility than hitherto. The hoisting-rope designated by D is arranged and applied in the same way as those in my patented device previously alluded to.

E E' represent the two levers pertaining to the discharging device. These levers are secured by pivots $e$—one to each fork arm or frame A—and the lever E is provided with an extension, $f$. The inner ends of the levers E E' are connected by a pin, $g$. These parts are also arranged in the same way as those shown in my patented implement. The discharging-rope F, however, is differently attached or arranged. This rope F in my present improvement has one end attached to the extension $f$ of the lever E near its end, as shown at $h$, and it extends down and passes around a pulley, $i$, at the lower end of one of the fork arms or frames A, and then passes around a pulley, $j$, at the end of the extension $f$ of the lever E. By this arrangement it will be seen that the levers E E' are operated to distend or force apart the fork arms or frames with a leverage power or purchase similar to that of a tackle-block, and hence with much less labor or effort than hitherto.

Having thus described my invention, what I claim as new, and desire to secure by Letters Patent, is—

1. The swivel-pulley C, applied to the fork arms or frames A A, substantially as and for the purpose herein set forth.

2. The applying of the rope F to the extension $f$ of the lever E through the medium of the pulleys $i$ $j$, arranged substantially in the manner as and for the purpose herein set forth.

SQUIRE RAYMOND.

Witnesses:
ABRAM W. STEVENS,
GEORGE N. RAYMOND.